(12) United States Patent
Mostafa

(10) Patent No.: US 6,895,247 B2
(45) Date of Patent: May 17, 2005

(54) SYSTEM AND METHOD FOR OBTAINING OPTIMUM RF PERFORMANCE WHEN CO-SITING CELLULAR BASE STATIONS

(75) Inventor: Ayman Mostafa, Cary, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 588 days.

(21) Appl. No.: 09/999,578

(22) Filed: Nov. 1, 2001

(65) Prior Publication Data

US 2003/0083072 A1 May 1, 2003

(51) Int. Cl.[7] .................................................. H04Q 7/20
(52) U.S. Cl. .................... 455/448; 455/446; 455/239.1; 455/240.1; 455/63.1
(58) Field of Search ................................ 455/448, 449, 455/232.1, 239.1, 240.1, 245.1, 245.2, 562.1, 13.3, 19, 422.1, 426.1, 426.2, 446, 520, 62, 63.1, 63.2, 82, 83, 550.1, 555, 560, 561, 13.1, 92, 67.11, 123, 125, 127.1, 138

(56) References Cited

U.S. PATENT DOCUMENTS

| | | | | |
|---|---|---|---|---|
| 5,852,405 A | * | 12/1998 | Yoneda et al. ......... | 340/825.02 |
| 6,029,048 A | * | 2/2000 | Treatch .................... | 455/7 |
| 6,061,565 A | * | 5/2000 | Innes et al. ............... | 455/436 |
| 6,094,211 A | * | 7/2000 | Baran et al. .............. | 725/125 |
| 6,704,298 B1 | * | 3/2004 | Matsumiya et al. ....... | 370/315 |
| 6,735,424 B1 | * | 5/2004 | Larson et al. ............ | 455/250.1 |
| 6,738,604 B2 | * | 5/2004 | Swazey ..................... | 455/118 |
| 2003/0054861 A1 | * | 3/2003 | Skarby ...................... | 455/561 |
| 2003/0228853 A1 | * | 12/2003 | Kazakevich et al. ....... | 455/136 |

* cited by examiner

*Primary Examiner*—Jean Gelin
(74) *Attorney, Agent, or Firm*—Moore & Van Allen PLLC; Gregory A. Stephens

(57) ABSTRACT

A method of obtaining optimum RF performance for a slave base station when co-siting a master base station with said slave base station involves calculating operating characteristics of the slave base station that is sharing an antenna assembly with the master base station. The third order intercept (IP3) and the noise figure (NF) characteristics of the slave base station are calculated and plotted versus a range of upfront gain values. The plots are studied and compared against vendor specifications and standalone performance characteristics. A desired upfront gain value is then selected to achieve a particular IP3 and NF characteristic for the slave base station. Upon selection, the upfront gain supplied to the slave base station is adjusted via an attenuator placed in-line before the slave base station to match the desired upfront gain.

14 Claims, 3 Drawing Sheets

SYSTEM AND METHOD FOR OBTAINING OPTIMUM RF PERFORMANCE WHEN CO-SITING CELLULAR BASE STATIONS

FIELD OF THE INVENTION

The present invention relates to a system and method for optimizing a slave base station co-sited with a master base station. More particularly, the present invention relates to an adjustable system and method for optimizing RF performance of a slave base station co-sited with a master base station taking into consideration the capacity and coverage requirements of the slave base station.

BACKGROUND OF THE INVENTION

There has arisen a need to couple multiple cellular base stations with a single antenna assembly. Such base station coupling is termed co-siting. Co-siting cellular base stations provides for economies of space as well as cost. The need to co-site has arisen due to the proliferation of portable wireless communications device usage and the competing cellular phone technologies (e.g., TDMA, GSM, AMPS, CDMA).

Terrestrial based portable wireless communications device communications require a network of base stations acting as middlemen. Base stations send and receive signals between portable wireless communications devices and wireless or wireline switching centers. These base stations form cells of coverage. Base stations have a limited coverage area. Thus, a network of base stations is required to provide coverage to a large area. Each base station requires a large antenna assembly to pick-up and transmit signals to and from portable wireless communications devices.

Base stations were initially tied to an antenna assembly on a one-to-one basis depending on the flavor of the cellular system (e.g., TDMA, GSM, AMPS, CDMA). The antenna specifications were matched to the base station specifications in order to provide optimum RF performance. However, the proliferation of cellular phone usage and cellular phone technologies would require a corresponding increase in the number of base station and antenna assemblies under a one-to-one correspondence scenario. Due to the large and typically unappealing visual impact of antenna assemblies, it is desirable to minimize the number of antenna assemblies. The benefits of antenna sharing include staying within the space limitations on a particular tower assembly, the elimination of the need for labor and materials associated with adding a new antenna to a tower, the maintenance costs associated with an antenna, among others.

From a technical standpoint it is possible to "share" an antenna assembly among multiple base stations even if each base station is using a different technology. Thus, multiple base stations can be co-sited with a single antenna assembly thereby reducing the need for additional unsightly antenna assemblies.

The problem with sharing antenna assemblies among multiple disparate base station systems is that each base station uses a different set of specifications with respect to the antenna/base station interface. Thus, additional measures must be taken to provide the proper signal characteristics to each base station.

Currently, the signal gain level is adjusted in the master base station to match the expected signal gain level of a slave base station. The master base station is the base station that is directly coupled to the antenna assembly. Slave base stations receive their signals via an antenna sharing component in the master base station after the signal gain level has been adjusted. Adjusting the gain, however, has effects on the quality of the signal and often results in less than optimum RF performance.

What is needed is an apparatus for dynamically adjusting the gain to achieve optimal performance with respect to both signal strength and signal quality.

SUMMARY OF THE INVENTION

When co-siting a base station with an existing base station, it is important not to affect the RF performance of the existing base station. Co-siting should not affect the current coverage footprint, traffic capacity, or interference limits that existed before. The present invention exploits an RF tradeoff between the system noise figure and inter-modulation rejection within a base station. However, the present invention is for fine tuning the system noise figure and inter-modulation rejection on the magnitude of ±1 dB.

Co-siting base stations requires that the master base station receive the antenna feed directly and provide a connection to each of the slave base stations. The active gain stage of the master base station is inserted in front of the slave base stations. This has the unwanted effect of degrading the third order intercept (IP3) of the RF signal. The degree of degradation depends on the gain level of the master base station gain stage, the linearity of the front-end of the master base station, and the upfront gain at the input of the slave base station.

The present invention identifies and provides an apparatus for exploiting the relationship between receiver inter-modulation (IM/IP3) and system noise figure (NF). The IP3 of a slave base station is calculated as well as the cascaded noise figure (NF). These values are plotted against the upfront gain. Once the curves (plots) for NF and IP3 have been determined, the most suitable gain level can be selected for optimal radio performance depending on the desired coverage and capacity of the slave base station. The gain level can then be adjusted using an attenuator coupled with the cable between the master and slave base stations. The attenuator would function to control the amount of gain supplied to the slave base station. The attenuator can be an device that is manipulated by an operator on site. Or, the attenuator can be remotely controlled via software over a network connection.

Ideally, both types of attenuators will be implemented. The operator manipulated device can be set at the time of installation of the slave base station to reflect the operating conditions at that time. A second, software controllable, attenuator can also be implemented to dynamically respond to changes in the operating characteristics of the base station. For instance, the base station could be subjected to a temporary increase in capacity due to a large concentration of portable wireless communications devices being used in the coverage area of the base station. Such a situation may occur near a sports stadium, a convention center, or any other facility that experiences high density populations from time to time. During such a time, portable wireless communications device usage could increase to levels that the base station can not handle in the most optimal way. The software controlled attenuator can adjust the gain value to a new optimal value based on new curve data for IP3 and NF.

DETAILED DESCRIPTION OF THE INVENTION

The present invention addresses the problem of sharing the receive side antenna assembly among multiple base stations that use different cellular technologies. The figures and discussion herein illustrate a scenario involving a master base station and a single slave base station. This was done for ease of illustration and explanation only. Co-siting multiple slave base stations can readily be done by imitating the concept used for a single slave base station. All that need be done is to determine the IP3 and NF curves for each particular slave base station and provide for means of attenuation to achieve optimal RF performance.

Figure 1:
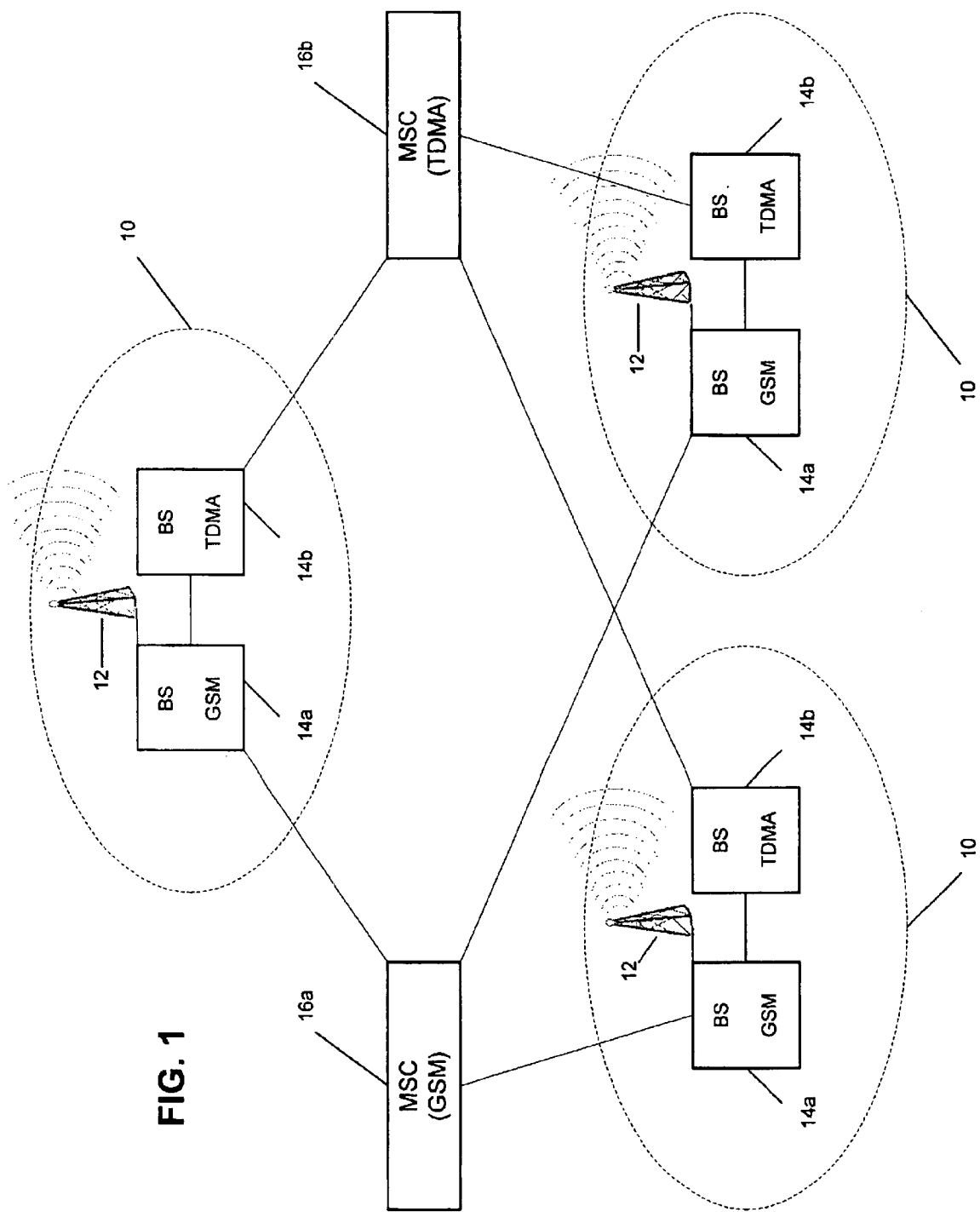
FIG. 1 is a generic block diagram illustrating the connections among base stations and mobile switching centers.

FIG. 1 is a generic block diagram illustrating the connections among base stations and mobile switching centers. Shown here are three areas of coverage or cells 10. Within each cell 10 is an antenna assembly 12 that is shared by a pair of base stations, one a GSM base station 14a and the other a TDMA base station 14b. Each base station 14a,14b is coupled with a mobile switching center (MSC) 16a,16b depending on the cellular technology employed, e.g. GSM or TDMA.

The MSCs 16a,16b are also coupled with the wireless or wireline telephony infrastructure such that calls involving portable wireless communications devices within one of the cells 10 serviced by an MSC 16a,16b are connected with another end user, be it wireless or wireline.

The determination on which base station is the master and which is the slave depends on which base station is being added to the antenna assembly. Logically, the second base station would become the master since it will be equipped with the requisite antenna sharing components. The original base station likely contained no such antenna sharing components since it did not contemplate sharing its antenna assembly. In the case where a new antenna assembly is being deployed with co-sited base stations, then it becomes a design choice as to which base station should be the master and which should be the slave since either can be equipped with antenna sharing components at the outset.

In FIG. 1, base station 14a is shown as the master base station since it is directly coupled to the antenna 12. Slave base station 14b receives its antenna feed via master base station 14a.

Figure 2:
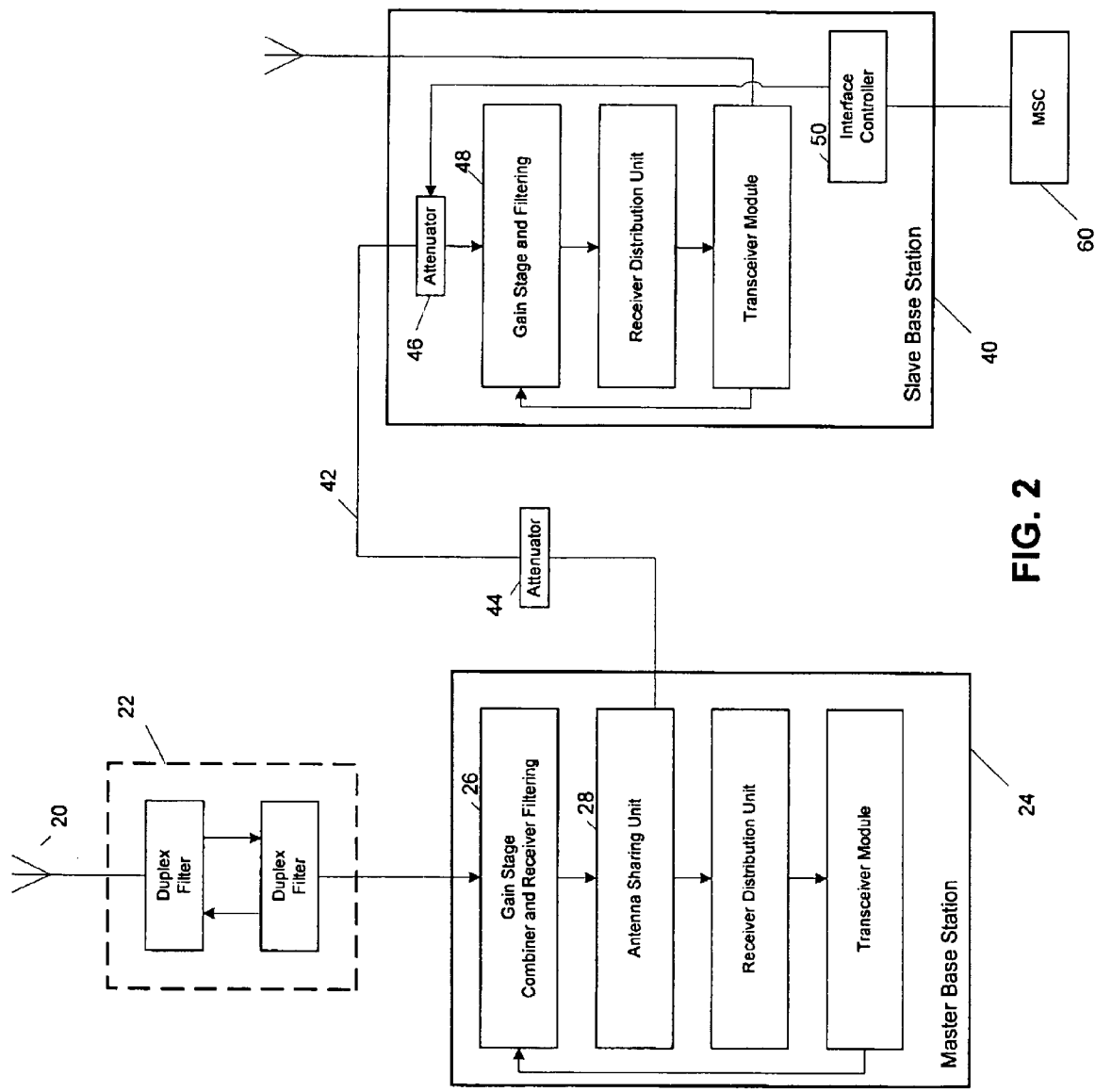
FIG. 2 illustrates a more detailed block diagram of the antenna assembly, master base station, and slave base station.

FIG. 2 illustrates a more detailed block diagram of the antenna assembly, master base station, and slave base station. An antenna assembly 20 is connected to an optional dual duplex tower mounted amplifier (DDTMA) unit 22. The antenna assembly 20 assists in both reception (Rx) and transmission (Tx) of RF signals. It should be noted that the use of additional antenna assemblies for the purpose of providing RF diversity can be implemented without affecting the concept of the present invention. For ease of illustration only, the description is limited to a single antenna assembly 20.

If implemented, the DDTMA 22 amplifies received signals coming from portable wireless communications devices within the area of coverage. The received signals often require amplification in order to be processed effectively downstream. The antenna assembly 20 and DDTMA 22 combination is directly coupled to a master base station 24.

Master base station 24 feeds the received from the DDTMA 22 and applies the signal to a gain stage 26. Following the gain stage 26 the signal is forwarded to an antenna sharing unit (ASU) 28 that is responsible for splitting the signal so that it can be fed to a slave base station 40. The signal that is presented to the slave base station 40 includes an upfront gain that is the result of the processing applied in the master base station 24. The idea is to make sure the upfront gain resulting from processing in the master base station 24 matches the upfront gain expected by the slave base station 40 had the slave base station 40 been directly coupled with the DDTMA 22. Current solutions to antenna sharing focus solely on the upfront gain to ensure that the gain level supplied by the master base station 24 is the same as that expected by the slave base station 40. The problem is that any signal manipulation by master base station 24 with respect to the upfront gain supplied to slave base station 40 will degrade the third order intercept (IP3) of the signal presented to slave base station 40 and affect the system noise figure (NF). IP3 degradation affects the integrity of the signal being processed by slave base station 40.

It is important to note that standalone (i.e., non co-sited) basestation specifications could have an upfront gain when a DDTMA or TMA is used. The gain stage 26 in the master base station 24 could be set to provide the expected upfront gain of the slave base station 40. Even if this is the case, the overall NF and IP3 values were changed with the addition of the master base station 24 such that the upfront gain still needs to be fine tuned by the present invention in order to optimize the RF performance of the slave base station 40.

Thus, the goal is to provide the proper amount of upfront gain to slave base station 40 in order to provide optimal RF performance. This requires considering the inter-modulation (IM)/IP3 and NF characteristics associated with a particular upfront gain value. In order to determine the optimal upfront gain, both IP3 and NF characteristics of slave base station 40 must be known. These values are readily obtainable for a range of upfront gain values and can be plotted. Moreover, the cellular technology itself has promulgated standards that must be met to ensure adequate system quality. Also, individual vendors also have their own, stricter, standards to meet. All of these values (IP3, NF, industry standards, and vendor standards) can be plotted against upfront gain.

As stated previously, simply adjusting the upfront gain to a desired expected level has the effect of degrading IP3 performance for the slave base station 40. Typically, the degradation does not fall below industry standards but often unnecessarily degrades overall system performance. By studying the plots of these values versus upfront gain, the optimal upfront gain value can be determined. Moreover, this process can be tailored to suit the needs of a particular base station. IP3/IM relates to the interference a signal might be subjected to thereby affecting the capacity of the base station. NF, by contrast, relates to the power of the signal thereby affecting the coverage of the base station. IP3 and NF also define the dynamic range (DR) of the base station receiver. As was earlier noted, the present invention is a fine tuning system that makes adjustments on the order of ±1 dB as is evident in FIG. 3. Thus, the dynamic range (DR) of the slave base station is negligibly affected.

The method for adjusting the upfront gain involves the use of attenuator(s) coupled to the cable(s) connecting the master base station 24 to the slave base station 40. One embodiment of an attenuator(s) can be physical device coupled to cable. This attenuator 44 would be manually controllable by an operator at the base station. Typically, this attenuator 44 would be set for an optimal gain value based on characteristics as they exist at the time of installation of the attenuator 44.

A second attenuator 46 can be situated within the slave base station 40 prior to the gain stage and filtering component 48 of slave base station 40. This could be a software controllable attenuator that is coupled to an interface controller 50 or the like. The interface controller 50 is coupled to the base station's servicing MSC 60. The MSC 60 provides for a convenient remote access point for controlling attenuator 46. Other means of remotely controlling attenuator 46 can be implemented without departing from the spirit or scope of the present invention.

The elements and components shown in FIG. 2 that are not enumerated or described are typical to base stations in general and do not play a role with respect to the present invention.

Plots of IP3 and NF versus upfront gain provide a spectrum of choices. If coverage is a primary factor for a particular base station (e.g., one that is rurally situated), then an upfront gain that maximizes NF performance can be chosen. Or, if base station capacity is important (e.g., one that is situated amongst a dense population), then an upfront gain that minimizes IP3 degradation can be chosen. Since the plots are over a range of upfront gain values, the upfront gain that best suits the needs of a particular base station can be selected using a tradeoff between IP3 and NF.

In addition, if the status of a base station changes over time, or changes temporarily, the upfront gain can be adjusted to reflect the new operating characteristics of the base station. This could occur, for instance, in an area that is undergoing rapid development where capacity is becoming more of a factor. Another scenario could be a rural area that is home to a sports stadium or convention center that temporarily experiences high population densities.

Figure 3:
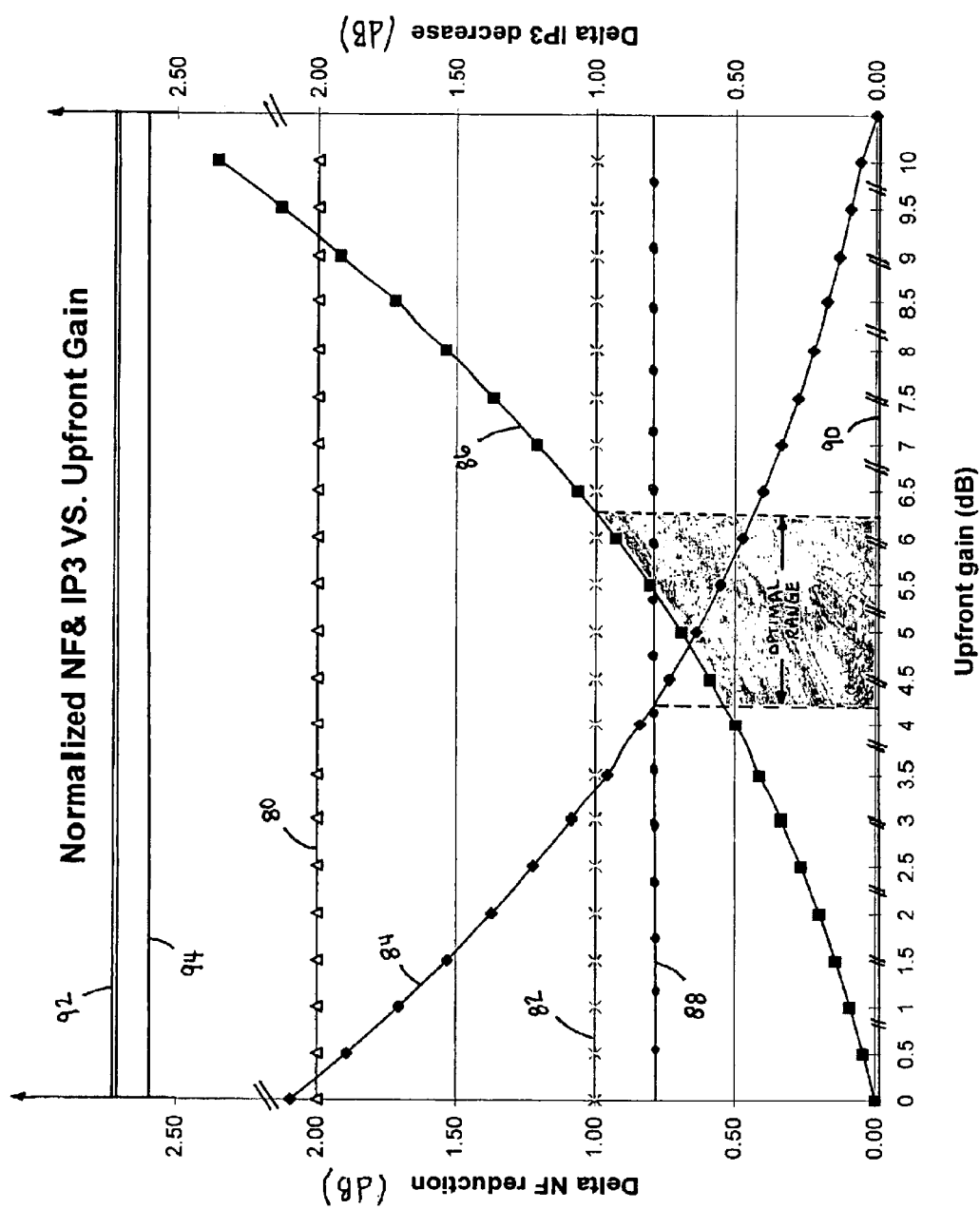
FIG. 3 illustrates several plots of IP3 values and NF values versus upfront gain.

FIG. 3 illustrates several plots of IP3 values and NF values versus upfront gain for a typical state of the art receiver system. The x-axis represents the upfront gain ranging from 0 to 10 dB left to right. The left side y-axis represents the change in the noise figure (NF) while the right side y-axis represents the change in IP3. There are eight (8) plots illustrated.

Plot 80 represents the vendor specification for the noise function (NF). It is a horizontal line having a y-value of 2. Any operating value of NF above plot 80 yields an NF that is worse than the vendor specifications while any value below plot 80 yields an NF that is better than the vendor specifications.

Plot 82 represents the vendor specification for the third order intercept (IP3). It is a horizontal line having a y-value of one. Any operating value of IP3 above plot 82 yields an IP3 that is worse than the vendor specifications while any value below plot 82 yields an IP3 that is better than the vendor specifications.

Plot 84 represents the change in the noise function (NF) as a function of the upfront gain. It is a downward sloping line from left to right. As the upfront gain increases the change in (delta) the noise figure decreases which is beneficial. Since NF affects power it makes sense that the greater the upfront gain the greater the coverage area that can be served by the base station. Increased power comes at a cost, however, as can be seen by the plot 86 of IP3.

Plot 86 represents the change in the third order intercept (IP3) as a function of the upfront gain. It is an upward sloping line from left to right. As the upfront gain increases the change in (delta) IP3 increases which is deleterious. Since IP3 represents interference which affects capacity, it makes sense that the greater the upfront gain the greater the inter-modulation interference and thus, the worse the capacity that can be served by the base station.

The dynamic range (DR) of the base station receiver is a function of the receiver's noise floor and high level signal. Noise floor depends on the noise figure (NF) while the high level signal is dependent on the third order intercept (IP3). Reducing IP3 results in a shortening of dynamic range. An increase in NF also results in a shortening of dynamic range. Mathematically, a 1 dB increase in NF corresponds to a $\frac{2}{3}$ dB decrease in IP3 meaning that a change in NF has a greater affect on dynamic range than a change in IP3. However, since the present invention typically does not change either NF or IP3 by more than 1 dB in either direction, the dynamic range (DR) is negligibly affected with respect to overall system performance.

By studying all of the plots together it can be determined that any upfront gain greater than approximately ½ dB will provide for an improved noise figure (NF) with respect to the vendor specifications. Similarly, any gain value less than approximately 6.25 dB will provide for an improved third order intercept (IP3) with respect to the vendor specifications.

Now consider plots 88 and 90 which represent the standalone NF and standalone IP3 characteristics respectively. Standalone characteristics refer to the NF and IP3 of a base station if it were not co-sited with another base station. Naturally these values may be better than the vendor specifications since the design did not consider a signal that would be shared with another base station.

The standalone NF plot 88 is a horizontal line with a y-axis value of approximately 0.75. Thus, co-siting base stations and providing an upfront gain values above approximately 4 dB will start to reduce NF with respect to a standalone base station.

The standalone IP3 plot 90 is a horizontal line with a y-axis value of approximately zero. Thus, co-siting base stations and providing any upfront gain values will start to degrade IP3 performance with respect to a standalone base station.

For the sake of completeness, we can plot the industry accepted standards of NF 92 and IP3 94. As one might expect, these plots are the least restrictive to performance since the vendors generally build their products to tolerances that exceed industry standards. Nevertheless, the plots do serve to provide a complete picture of overall system performance. Plots 92 and 94 have been arbitrarily given y-axis values that reflect less restrictive standards than the vendor specification plots of NF 80 and IP3 82.

Plots 84 and 86 provide a sliding scale of performance characteristics. It is clear that adding gain degrades IP3 performance but improves NF performance. Each base station may have its own specific operating criteria with respect to coverage and capacity that will not be met by arbitrarily adding gain to match an expected value. The expected gain value could actually cause too much IP3 degradation for a coverage sensitive base station. While the extra gain may not degrade performance below industry specifications, it may degrade performance below vendor specifications.

The plots of FIG. 3 show that an upfront gain range between approximately 4 to 6.25 dB will provide NF performance better than that of standalone while still maintaining IP3 performance within vendor specifications. Higher gains will degrade IP3 performance beyond vendor specifications while lower gains will not meet standalone NF performance.

The present invention is described herein in the context of a portable wireless communications device. As used herein, the term "portable wireless communications device" may include a cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Portable wireless communications devices may also be referred to as "pervasive computing" devices.

The present invention may be embodied as cellular communication systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the following claims, any means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A method of obtaining optimum RF performance for a slave base station when co-siting a master base station with said slave base station, said method comprising:
    calculating the third order intercept (IP3) characteristics of the slave base station that is sharing an antenna assembly with said master base station;
    calculating the noise figure (NF) characteristics of the slave base station;
    plotting the IP3 and NF characteristics of the slave base station versus a range of up-front gain values;
    selecting a desired upfront gain value to achieve a particular IP3 and NF characteristic; and
    adjusting the upfront gain supplied to the slave base station to match the desired up-front gain.

2. The method of claim 1 further comprising plotting vendor specifications with respect to IP3 and NF characteristics in order to assist in the selection of the desired up-front gain value such that the desired selection is optimized with respect to the vendor specifications for IP3 and NF characteristics.

3. The method of claim 2 further comprising plotting standalone specifications with respect to IP3 and NF characteristics in order to assist in the selection of the desired upfront gain value such that the desired selection is optimized with respect to the standalone IP3 and NF characteristics.

4. The method of claim 1 further comprising plotting industry specifications with respect to IP3 and NF characteristics in order to assist in the selection of the desired upfront gain value such that the desired selection is optimized with respect to the industry IP3 and NF characteristics.

5. A system for obtaining optimum RF performance for a slave base station when co-siting a master base station with said slave base station, said system comprising:
    means for calculating the third order intercept (IP3) characteristics of the slave base station that is sharing an antenna assembly with said master base station;
    means for calculating the noise figure (NF) characteristics of the slave base station;
    means for plotting the IP3 and NF characteristics of the slave base station versus a range of upfront gain values;
    means for selecting a desired upfront gain value to achieve a particular IP3 and NF characteristic; and
    means for adjusting the upfront gain supplied to the slave base station to match the desired upfront gain.

6. The system of claim 5 further comprising means for plotting vendor specifications with respect to IP3 and NF characteristics in order to assist in the selection of the desired upfront gain value such that the desired selection is optimized with respect to the vendor specifications for IP3 and NF characteristics.

7. The system of claim 6 further comprising means for plotting standalone specifications with respect to IP3 and NF characteristics in order to assist in the selection of the desired upfront gain value such that the desired selection is optimized with respect to the standalone IP3 and NF characteristics.

8. The system of claim 5 further comprising plotting industry specifications with respect to IP3 and NF characteristics in order to assist in the selection of the desired upfront gain value such that the desired selection is optimized with respect to the industry IP3 and NF characteristics.

9. A system for obtaining optimum RF performance for a slave base station when co-siting a master base station with said slave base station, said system comprising:
    a slave base station coupled by an electrical cable to an antenna assembly via an antenna sharing unit within a master base station;
    an attenuator coupled to said electrical cable for adjusting the upfront gain supplied to said slave base station, wherein said attenuator is adjusted according to calculations of the third order intercept (IP3) and noise figure (NF) characteristics of the slave base station, and wherein said upfront gain is adjusted via said attenuator according to calculations of the third order intercept (IP3) and noise figure (NF) characteristics of the slave base station plotted against calculations of IP3 and NF characteristics with respect to vendor specifications.

10. The system of claim 9 wherein said upfront gain is adjusted via said attenuator according to calculations of the third order intercept (IP3) and noise figure (NF) characteristics of the slave base station plotted against calculations of IP3 and NF with respect to standalone specifications.

11. A computer program product for obtaining optimum RF performance for a slave base station when co-siting a master base station with said slave base station, the computer program product having a medium with a computer program embodied thereon, the computer program product comprising:

computer program code for calculating the third order intercept (IP3) characteristics of the slave base station that is sharing an antenna assembly with said master base station;

computer program code for calculating the noise figure (NF) characteristics of the slave base station;

computer program code for plotting the IP3 and NF characteristics of the slave base station versus a range of upfront gain values;

computer program code for selecting a desired upfront gain value to achieve a particular IP3 and NF characteristic; and computer program code for adjusting the upfront gain supplied to the slave base station to match the desired upfront gain.

12. The computer program product of claim 11 further comprising computer program code for plotting vendor specifications with respect to IP3 and NF characteristics in order to assist in the selection of the desired upfront gain value such that the desired selection is optimized with respect to the vendor specifications for IP3 and NF characteristics.

13. The computer program product of claim 11 further comprising computer program code for plotting standalone specifications with respect to IP3 and NF characteristics in order to assist in the selection of the desired upfront gain value such that the desired selection is optimized with respect to the standalone IP3 and NF characteristics.

14. The computer program product of claim 11 further comprising plotting industry specifications with respect to IP3 and NF characteristics in order to assist in the selection of the desired upfront gain value such that the desired selection is optimized with respect to the industry IP3 and NF characteristics.

\* \* \* \* \*